United States Patent [19]

Durbin et al.

[11] Patent Number: 4,562,978
[45] Date of Patent: Jan. 7, 1986

[54] ADJUSTABLE MOUNTING TRAY FOR AIRCRAFT INERTIAL REFERENCE UNITS AND THE LIKE

[75] Inventors: Larry L. Durbin; Roy A. Zaborowski, both of Phoenix, Ariz.; Thomas R. Wolf, Goleta, Calif.

[73] Assignee: Sperry Corporation, New York, N.Y.

[21] Appl. No.: 553,936

[22] Filed: Nov. 21, 1983

[51] Int. Cl.[4] ............................................. B64D 43/00
[52] U.S. Cl. .................................. 244/1 R; 244/177; 248/178; 248/186; 73/1 E
[58] Field of Search .................... 244/1 R, 129.1, 177; 33/180 R, 181 R, 366, 382, 343; 248/183, 186, 178, 650, 664; 73/1 R, 1 E

[56] References Cited

U.S. PATENT DOCUMENTS

| | | | |
|---|---|---|---|
| 2,194,995 | 3/1940 | Bergquist | 33/343 |
| 3,576,124 | 4/1971 | O'Connor | 73/1 E |
| 3,816,935 | 6/1974 | Wilmot | 33/180 R |
| 4,103,852 | 8/1978 | Fisk | 248/178 |
| 4,448,377 | 5/1984 | Shinkle | 248/183 |
| 4,470,199 | 9/1984 | Krezak et al. | 33/180 R |

Primary Examiner—Trygve M. Blix
Assistant Examiner—Rodney Corl
Attorney, Agent, or Firm—Howard P. Terry; Albert B. Cooper

[57] ABSTRACT

An adjustable mounting tray for installation of an aircraft gyroscopic and/or inertial reference apparatus, comprises, a baseplate member mounted so that it is substantially level in roll and pitch on the equipment shelf or rack of a levelled aircraft. A top plate or tray member is pivotally mounted on the baseplate for azimuthal adjustment thereon. The aircraft is pitched up or down and the top plate rotated in azimuth to remove any roll/yaw cross-axis coupling thereby assuring precision longitudinal axis alignment.

11 Claims, 6 Drawing Figures

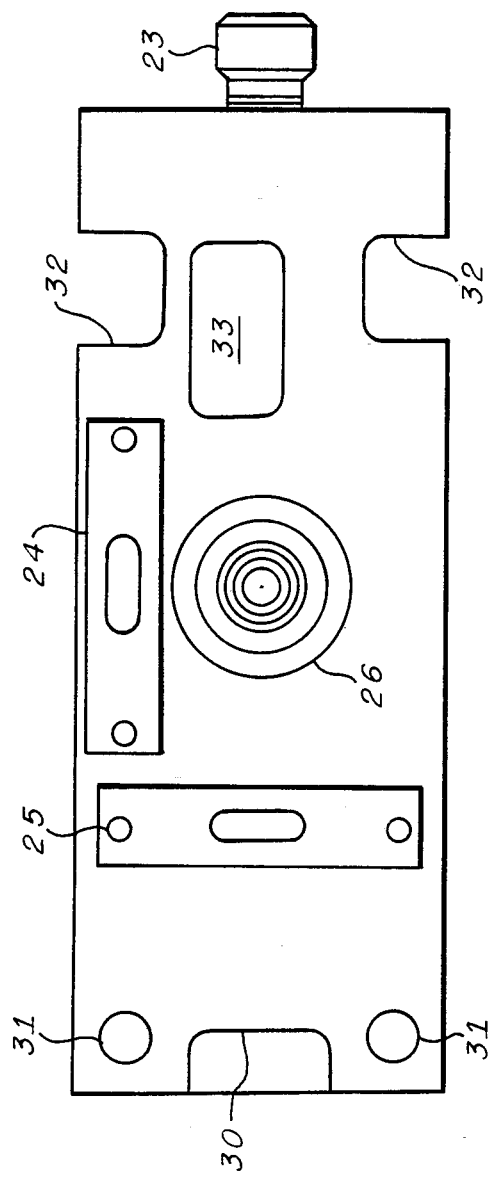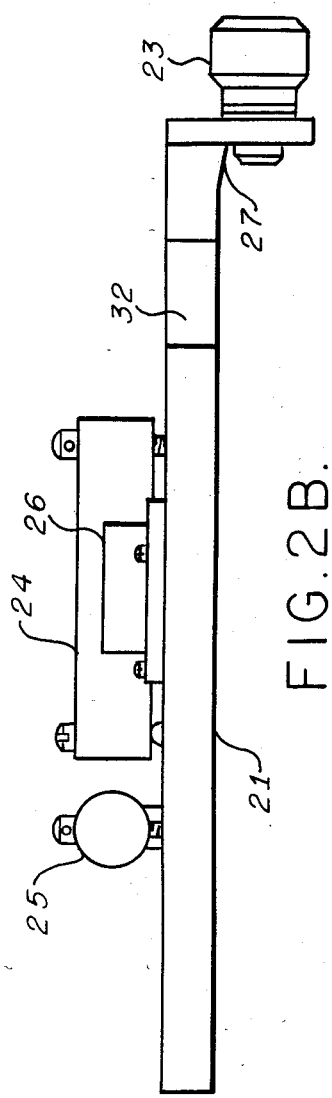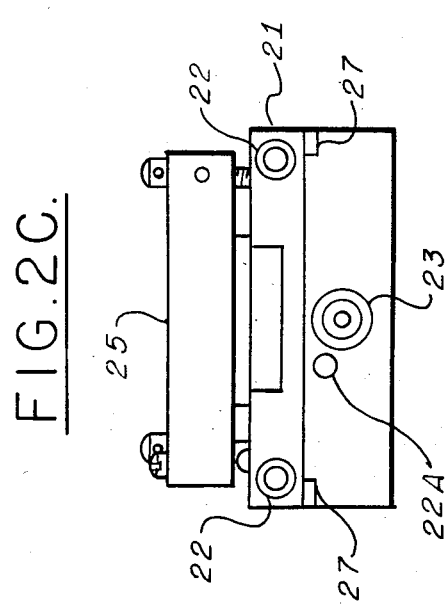

ADJUSTABLE MOUNTING TRAY FOR AIRCRAFT INERTIAL REFERENCE UNITS AND THE LIKE

BACKGROUND OF THE INVENTION

1. Field of the Invention

The present invention relates generally to gyroscopic reference apparatus, such as an inertial reference unit for an aircraft inertial navigation system (INS) or a strapped-down attitude and heading reference system (SAHRS) for an aircraft, hereinafter simply referred to as an inertial measurement unit or IMU. More particularly, the invention relates to an adjustable mounting tray for supporting the IMU in a precisely aligned position relative to the aircraft's primary coordinate system, i.e., its vertical, lateral and longitudinal axes.

2. Description of the Prior Art

A typical strapped-down attitude and heading reference system is disclosed in the present assignee's U.S. Pat. No. 4,212,443.

The mounting of an IMU, or equivalent element of an integrated SAHRS or INS, in an aircraft under construction presents no particular problem because the shelf for supporting the IMU may be readily precisely aligned with the aircraft's primary axes using the precision manufacturing jigs. However, the retrofit installation of an IMU in an aircraft does present a difficult problem since the shelf dedicated to the support of the IMU may not be precisely aligned with the aircraft axes or even a new shelf specifically installed for the IMU may not and generally will not be aligned to the required degree of accuracy; for example, on the order of ±0.2 degrees. While retrofit alignment relative to the vertical and lateral axis is relatively simple using precision levels, such as liquid levels, precise alignment with the longitudinal axes is very difficult because of the inaccessability to this physical axes in the aircraft.

Presently known techniques used heretofore involved leveling the aircraft in pitch and roll in accordance with the aircraft manufacturer's specific instructions, aligning the IMU mounting tray with the aircraft principal axes to the required degree of accuracy using elaborate and expensive optical alignment jigs and tools, temporarily clamping the tray in place and then match-drilling installation holes and finally bolting the tray in place. This technique is awkward and time-consuming and the potential for installation errors is high, with the correction for such errors being quite difficult and expensive.

SUMMARY OF THE INVENTION

The present invention provides a mounting tray which greatly simplifies the retrofit installation of an IMU in an aircraft, particularly simplifying the alignment of the IMU relative to the aircraft longitudinal or directional axes. Basically, the mounting tray consists of two elements or members: a base member which is roughly aligned with the aircraft primary axes, within say ±1.25 degrees, and a top plate member pivotally mounted on the base member for rotational adjustment about the vertical axes, i.e., azimuthal, or yaw, adjustment. The top plate member includes precision aligning pins which define a precision reference plane for the IMU chassis which, in turn, includes corresponding pin-receiving holes to which the internal inertial sensors are precisely aligned. An azimuthal or longitudinal axis-adjusting means, such as a thumbwheel, is provided on the top plate and cooperates with contact surfaces on the baseplate. An alignment tool, including roll and pitch precision liquid levels, mounts on the top plate aligning pins. The base member of the tray assembly is bolted to the aircraft equipment rack with the aircraft level in roll and pitch and precisely shimmed so that the liquid levels indicate level within the required accuracy, say ±0.2 degrees, and aligned fore and aft to within about 1.0 degrees, which is normally easily achievable using the aircraft manufacturer's drawings and conventional measuring means.

The roll liquid level bubble position is identified using a scribe grease pencil or the like and the aircraft nose-jack is adjusted to pitch the aircraft up or down a number of degrees; at least two degrees. If the top plate is not aligned longitudinally, the roll liquid level bubble will move away from its marked position due to roll-yaw axes cross-coupling. The thumbwheel is rotated to move the top plate in azimuth relative to the baseplate in a direction and to an amount to return the roll axes liquid level bubble to its marked position thus removing the cross-axes error and the top plate is then clamped to the baseplate. The mounting tray is now precisely aligned in pitch, roll, and yaw, the aligning tool is removed, and the tray ready to receive the IMU.

It will be understood, of course, that the tray may be mounted athwartship with a conventional interchange of roll, pitch and yaw axes identification. Also, the mounting tray may be similarly aligned for skew-axis installations.

BRIEF DESCRIPTION OF THE DRAWINGS

A preferred embodiment of the present invention is illustrated in the accompanying drawings wherein:

FIGS. 2A, 2B and 2C are plan, side elevation and end elevation views of the aligning tool used for installing the mounting tray.

DESCRIPTION OF THE PREFERRED EMBODIMENT

Figure 1A:
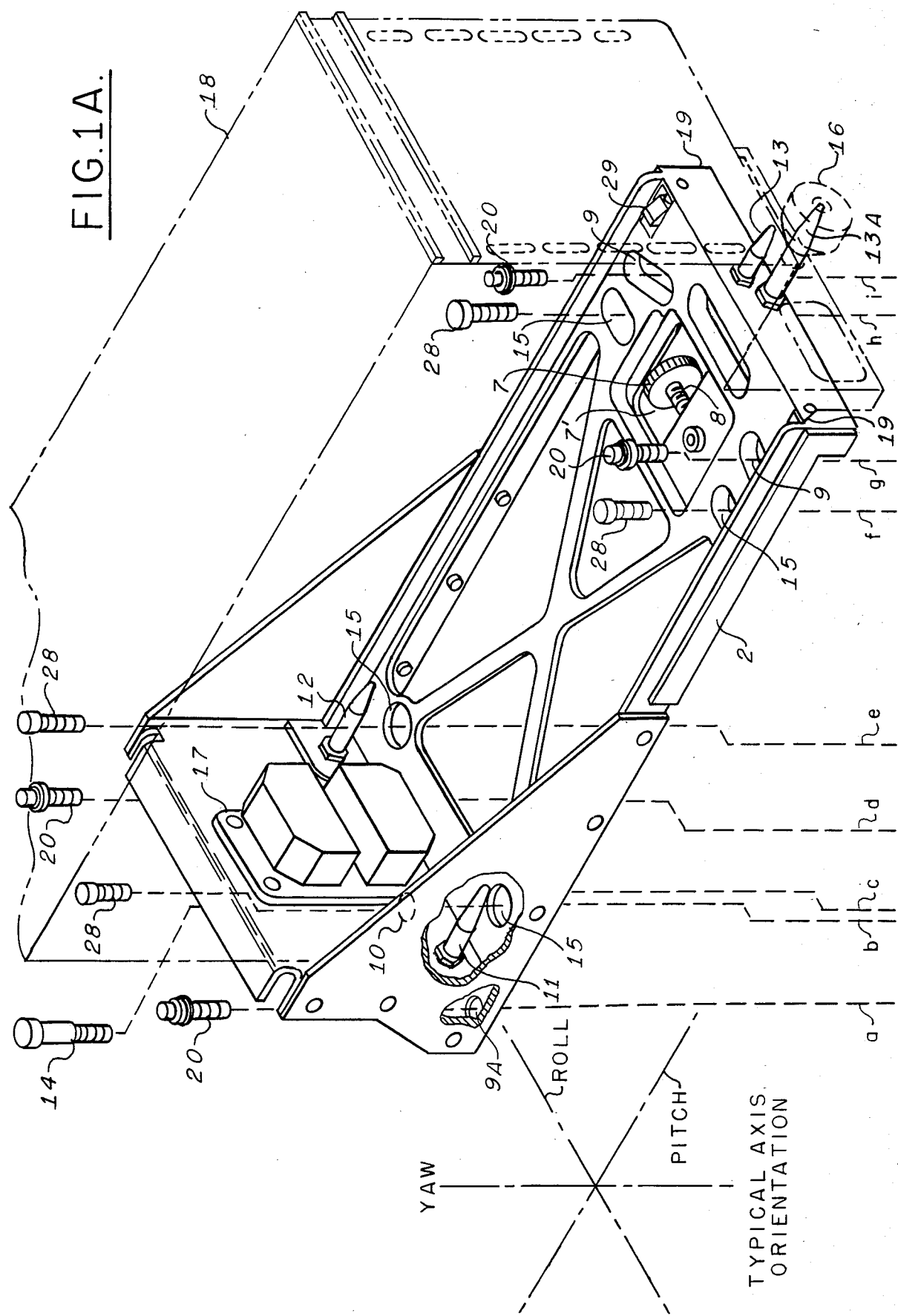
FIGS. 1A and 1B are exploded perspective views of the mounting tray.
Figure 1B:
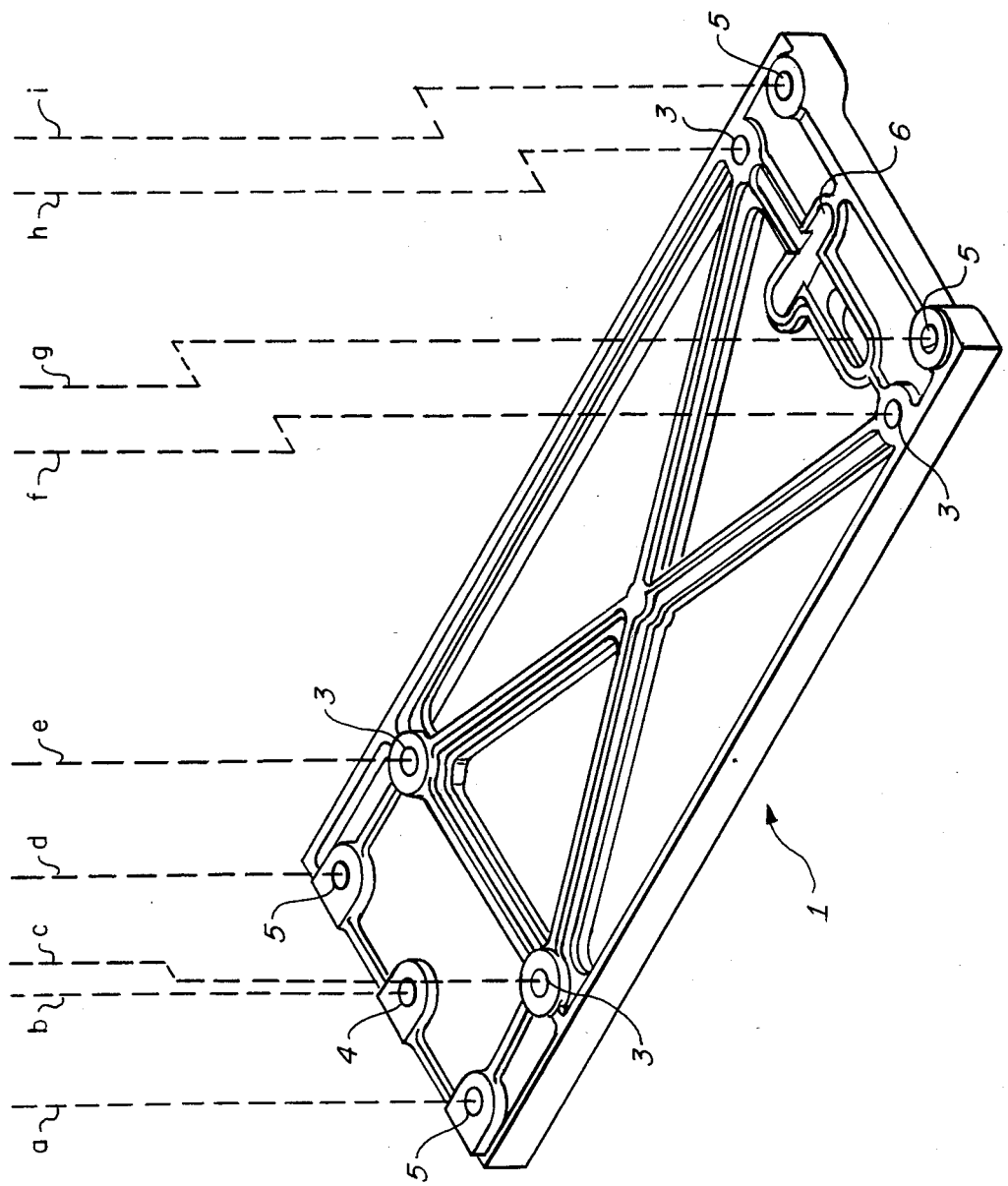

Referring now to FIG. 1, the mounting tray of the present invention comprises two major sub-components: the baseplate or base member 1 and the top plate or IMU-receiving tray 2. The baseplate 1 comprises a cast aluminum frame having an "x" webbing design to assure torsional rigidity against installation forces. Of course, the baseplate may be machined, if desired. As shown, the baseplate includes a number of bossed holes and cut-outs. Holes 3 receive mounting bolts 28 which are used for bolting the baseplate to the aircraft equipment rack or shelf; tapped hole 4 is used to receive a shoulder and pivot bolt 14 about which the top plate 2 may be azimuthally adjusted; tapped holes 5 receive clamping bolts 20 for clamping the top plate 2 to the baseplate 1 after alignment is accomplished; and a thumbwheel retainer cut-out or slot 6.

The top plate or IMU-mounting tray 2 comprises a cast aluminum frame, also including an "x" frame design for torsional rigidity, and sheet metal backing plates for supporting standard electrical interconnect receptacles 17. The top plate includes a number of holes and slots: holes 15 through which baseplate mounting bolts 28 freely pass; T-shaped clamping slots 9 and clamping holes 9A receiving washered bolts 20 for securing the adjusted top plate 2 to the baseplate 1; a pivot hole 10 at the rear center of the top plate adapted to receive the shoulder of pivotal bolt 14; thumbwheel 7 having threaded shaft 8 mounted in corresponding bosses (not shown) on the underside of the top plate 2 such that upon thumbwheel rotation, the thumbwheel moves laterally across opening 7' in the top plate; and finally, three aligning or guide pins 11, 12, and 13 which together define a plane surface reference datum for determining precision alignment of the installation aligning tool, to be described, and, of course, the IMU itself. A threaded insertion stud 13A is externally threaded to provide an insertion, extraction and hold-down mechanism for the IMU through suitable knurled knob 16 on the IMU. The rear guide pin 11 may have a diamond-shaped cross-section to permit lowered tolerancing of the guide pin locations yet still maintain the mounting accuracy required. It will be noted that certain of the bosses and cut-out edges define cooperating level surfaces between the baseplate and tray so that the tray is precisely mated with the base in the horizontal.

Referring now to FIGS. 2A, 2B and 2C, there is illustrated an alignment tool 21 which is used in conjunction with the assembled mounting tray to determine its precise alignment with the aircraft roll pitch and yaw axes. This tool comprises a generally flat aluminum plate conforming generally to the base dimensions of the IMU and includes two rear reference holes 22 which receive the alignment pins 11 and 12 of the top plate and a front reference hole 22A which receives alignment pin 13 of the top plate assembly 2. A front extrusion plate includes a threaded knob 23 which receives the insertion stud 13A of the top plate assembly 2, these holes defining a reference plane corresponding to that of the IMU. A pair of shallow beveled lips 27 at the front bottom of the tool 21 serve to wedge a beveled spring loaded block 29 to secure the tool to the tray and prevent any torsional movement of the tool relative to the tray. It will be noted that the tool 21 includes a rear cut-out 30 to provide clearance for the electrical connector 17, cut-outs 31 to provide clearance for mounting bolts 28, and front cut-outs 32 to provide clearance for the front clamping bolts 20 and mounting bolts 28. A through-hole 33 at the front of the plate provides access to the thumbwheel 7. A coarse, bidirectional level 26 is provided on the upper surface of the tool to facilitate initial pitch and roll alignment of the baseplate relative to the aircraft equipment shelf while pitch and roll precision direct reading liquid levels 24 and 25 provide precision level references for the tool. It will be appreciated that the precision direct reading levels 24 and 25 may be replaced with electrical liquid level accelerometers, such as that disclosed in the present assignee's U.S. Pat. Nos. 4,028,815 and 3,823,486 and suitable meter-type displays provided for remote level readouts.

Referring again to FIG. 1, the IMU is illustrated in dot-dash lines and, of course, includes rear holes for receiving the alignment pins 11 and 12 and a front hole for receiving alignment pin 13 and a front threaded knob 16 for receiving insertion stud 13A. As indicated above, jamming bevels 19 and spring loaded blocks 29 are also provided to assure a rigid IMU-tray interface. Conventional electrical connectors mate with receptacles 17 at the rear of the IMU.

Having described the structure of the mounting tray and alignment tool, the installation and precision alignment of the tray into the aircraft structure will now be described. Prior to installation, the baseplate 1 and top plate or tray 2 are assembled together. This is accomplished by inserting clamping screws 20 through T-slots 9 and holes 9A of the top plate and into threaded holes 5 of the baseplate 1 and by inserting the pivot bolt 14 through pivot hole 10 of the top plate into the threaded hole 4 and the rear of the baseplate. It might be stated at this point that the thumbscrew 7 and opening 7' are dimensioned so as to provide about ±2 degrees adjustment to prevent the IMU from contacting adjacent equipment which may be on the aircraft rack.

Now the assembled tray is mounted on the equipment tray of the aircraft. First, however, the aircraft must be raised up on jacks and leveled in pitch and roll within a degree or less using the aircraft manufacturer's instructions. An equipment shelf or rack is chosen for the tray installation. A reference line is drawn on the shelf as parallel to the aircraft longitudinal axis as possible, using the aircraft drawings and conventional measuring equipment; this line should be within ±1 degrees of such parallelism. The tray assembly is placed on the shelf with its front to rear axis parallel with the reference line (or its lateral axis parallel thereto if a lateral axes installation is chosen) and holes are matched drilled through base mounting holes 3. If the alignment tool 21 has not yet been attached to the tray assembly, it now is and the entire assembly is bolted to the shelf using shims to assure the bidirectional level 26 reads level to within ±0.2 degrees. The roll liquid level 15 is adjusted to indicate level and the bubble position is carefully marked using a scribe or other marker. Alternatively, liquid level 24 is adjusted to indicate level and similarity marked for lateral axis and installations.

It will be recalled that the fore and aft reference line is probably not parallel with the aircraft longitudinal axis and, of course, it must be to assure the accuracy of the IMU output data. In accordance with the present invention, the IMU mounting tray is now precisely aligned with the aircraft fore-aft axis. To accomplish this, the aircraft nose jack is used to raise or lower the aircraft nose at least two degrees, making sure that the aircraft remains level about the roll axis. Now, if the tray is not truly parallel to the aircraft longitudinal axis, tilting of the aircraft in pitch will result in the roll axis liquid level bubble moving away from its marked reference position due to inherent roll/yaw cross-axis coupling. Accordingly, the clamping bolts 20 are loosened and then the thumbwheel 7 rotated in a direction to cause the roll level bubble to move back toward its marked reference. The thumbwheel face contacts the slot 6 in base 1 causing the upper or top plate to pivot about pivot bolt 14. When the roll level is thus returned to its reference position, the cross-axis error is reduced to zero and the tray fore-aft axis is precisely parallel with the aircraft fore-aft axis. Clamping bolts 20 are now tightened securing the aligned IMU receiving tray 2 to the baseplate 1. The aligning tool 21 may now be removed and the tray is ready to receive the IMU.

Figure 3:
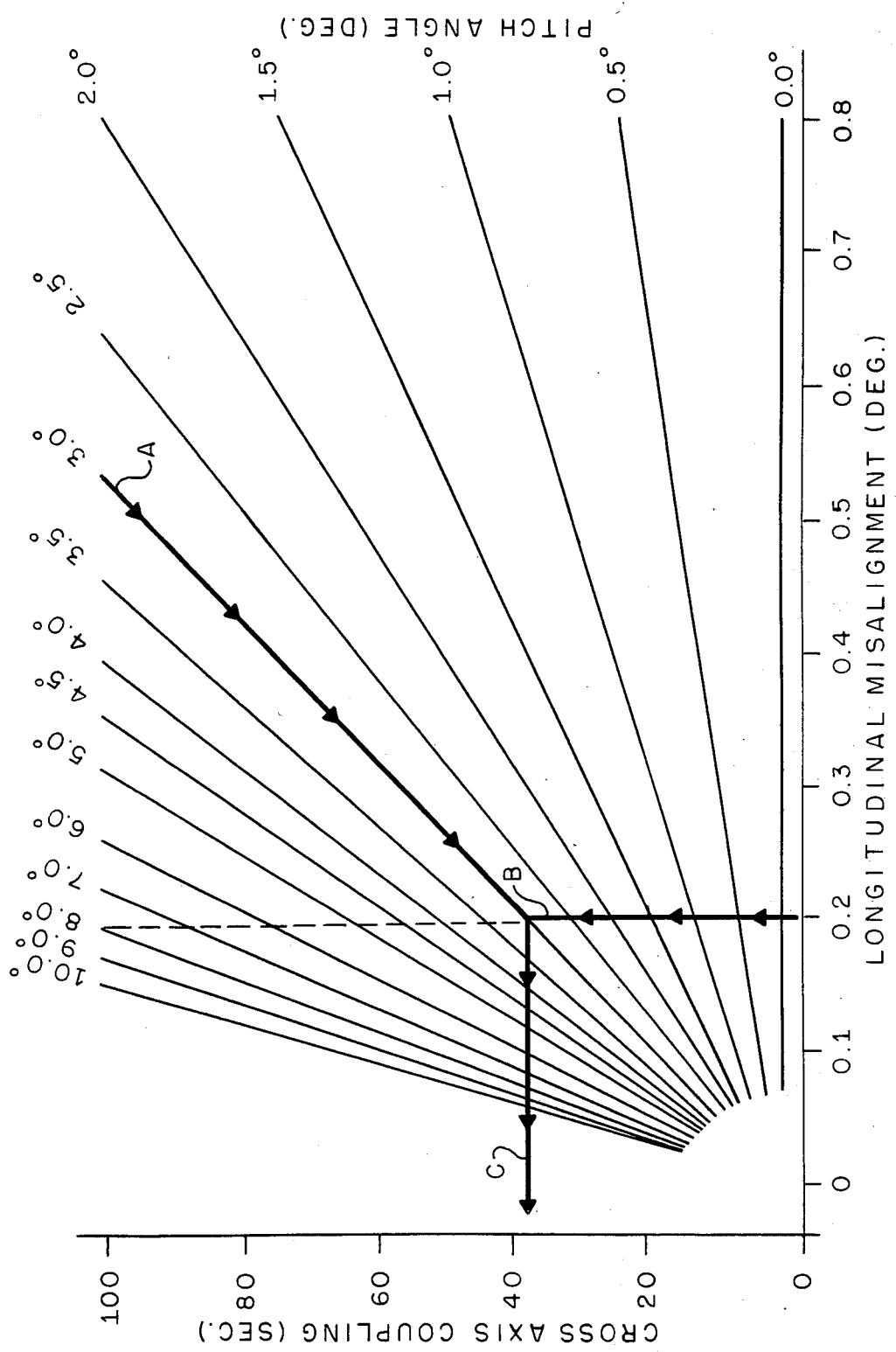
FIG. 3 is a chart useful in determining the minimum pitch angle adjustment of the aircraft during tray installation alignment.

The graph of FIG. 3 relates the longitudinal alignment accuracy to the cross-axis indication on the alignment tool for a variety of pitch angles which may be introduced during the alignment procedure. This graph may be used as follows:

(a) Assuming a perfectly leveled tray, locate the induced pitch angle on the graph, for example, three degrees (Point A);

(b) Follow the three degree pitch line to its intersection with the vertical line corresponding to the required longitudinal accuracy, for example ±0.2 degrees (Point B); and (c) Follow the horizontal line to the left and read the required accuracy in re-leveling the cross-axis to meet the longitudinal alignment accuracy specification (Point C). In this example, 38 arc second accuracy is required.

Similarly FIG. 3, the minimum pitch angle which must be placed on the aircraft is 1.5 degrees using 20 arc second sensitive levels as in the present embodiment in order to achieve a 0.2 degree longitudinal alignment requirement.

Thus, the adjustable mounting tray of the present invention permits an extremely precise alignment of the tray relative to the true aircraft longitudinal axis without the necessity of physically locating such axis and making measurements therefrom.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An adjustable mounting tray for aircraft for precisely aligning reference apparatus relative to the aircraft longitudinal axis without physically locating said axis and making measurements therefrom, said adjustable mounting tray comprising:
   (a) A base member adapted to be mounted in the aircraft so that it is substantially level about the roll and pitch axes and substantially aligned with said longitudinal axis,
   (b) an apparatus receiving tray member supported on said base member including means cooperable with said base member for maintaining said tray level in roll and pitch relative to said base member,
   (c) means coupled between said base member and mounting tray for adjusting the alignment of said tray relative to said base member, and said aircraft longitudinal axis to remove any cross-axis coupling between said roll axis and said longitudinal axis with the aircraft tilted about its pitch axis, and
   (d) means for clamping said mounting tray to said base member after adjusting said adjusting means.

2. An adjustable mounting tray as set forth in claim 1, wherein said level maintaining means includes a plurality of mating flat surfaces on the upper side of said base member and on the lower side of said tray.

3. An adjustable mounting tray as set forth in claim 2, wherein said adjusting means comprises:
   (a) pin means interconnecting said base member and tray for providing a pivot about which said tray may rotate relative to said base member in the horizontal plane defined by said roll and pitch axes, and
   (b) adjustable screw means having a first part cooperable with said base member and a second part cooperable with said tray for rotating said tray about said pivot pin.

4. An adjustable mounting tray as set forth in claim 3, wherein said second part comprises a screw journalled in said tray member and said first part comprises a thumbwheel abutting surfaces on said base member.

5. An adjustable mounting tray as set forth in claim 1, further including a tray installation tool, said tool comprising:
   (a) a removable frame means adapted for mounting on said apparatus tray in place of said reference apparatus, and
   (b) roll and pitch level indicator means mounted on said frame member for indicating the level condition of said tray and base member relative to the roll and pitch axes of said aircraft.

6. An adjustable mounting tray as set forth in claim 5, wherein said apparatus mounting tray includes at least three separable connecting means between said tray and said reference apparatus, said connecting means defining a common alignment reference for said tray and said reference apparatus.

7. An adjustable mounting tray as set forth in claim 6, wherein said installation tool frame means includes like separable connecting means.

8. An adjustable mounting tray as set forth in claim 6, wherein said separable connecting means comprises pin and slot connectors.

9. An adjustable mounting tray as set forth in claim 6, where said separable connecting means includes screw means for inserting extracting, and rigidly clamping said reference apparatus to said tray.

10. An adjustable mounting tray as set forth in claim 1, wherein said clamping means comprises at least one screw and slot connecting means between said base member and said tray.

11. A method for mounting and orienting an aircraft reference apparatus with the pitch, roll, and yaw axes of the aircraft using an adjustable mounting tray comprising a base member, an apparatus receiving tray member pivotally mounted on said base member for rotational adjustment relative to the aircraft longitudinal axis, and including means for pivotally adjusting said tray relative to said base member and said longitudinal axis, and for thereafter clamping said adjusted tray to said base member, said method comprising the steps of:
   (a) leveling the aircraft about its roll and pitch axes,
   (b) mounting said base member and tray on a substantially horizontal surface in said aircraft and using roll and pitch level sensors on said tray, shimming said base member on said surface so that it is substantially level in roll and pitch and substantially aligned with the aircraft longitudinal axis, and thereafter securing said base member to said mounting surface,
   (c) rotating the aircraft about its pitch axis while maintaining it level about its roll axes,
   (d) using the roll level sensor, noting any roll axis error due to misalignment of said base member relative to said longitudinal axis, due to roll-yaw cross-axis coupling,
   (e) adjusting said adjusting means to remove any such error, and then
   (f) clamping said adjusted tray to said base member.

* * * * *